May 18, 1937.  W. F. CRAWFORD  2,080,762
VEHICLE COVER SUPPORT
Filed Aug. 3, 1936  2 Sheets-Sheet 1
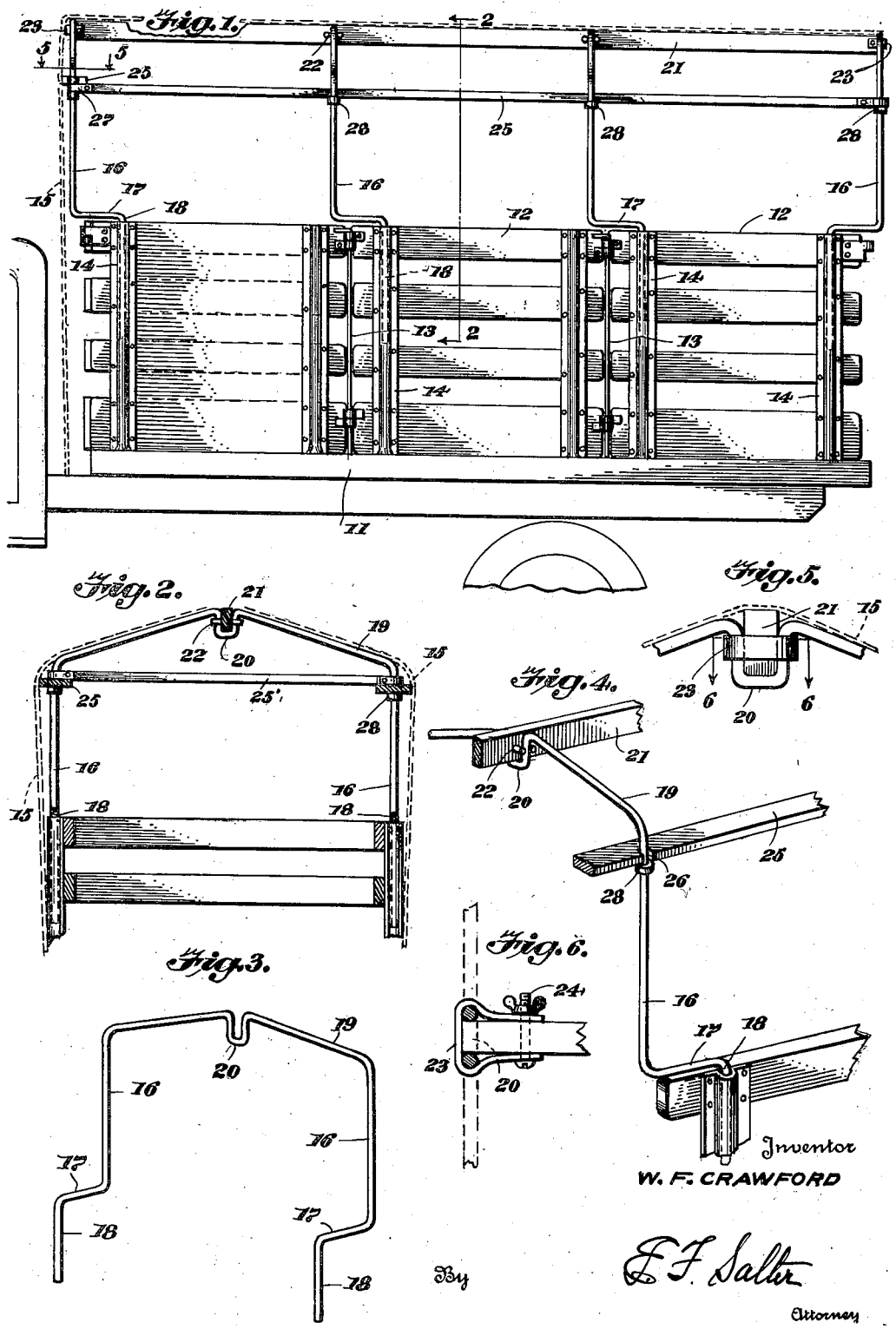
Inventor
W. F. CRAWFORD
By 
Attorney May 18, 1937. W. F. CRAWFORD 2,080,762
VEHICLE COVER SUPPORT
Filed Aug. 3, 1936 2 Sheets-Sheet 2
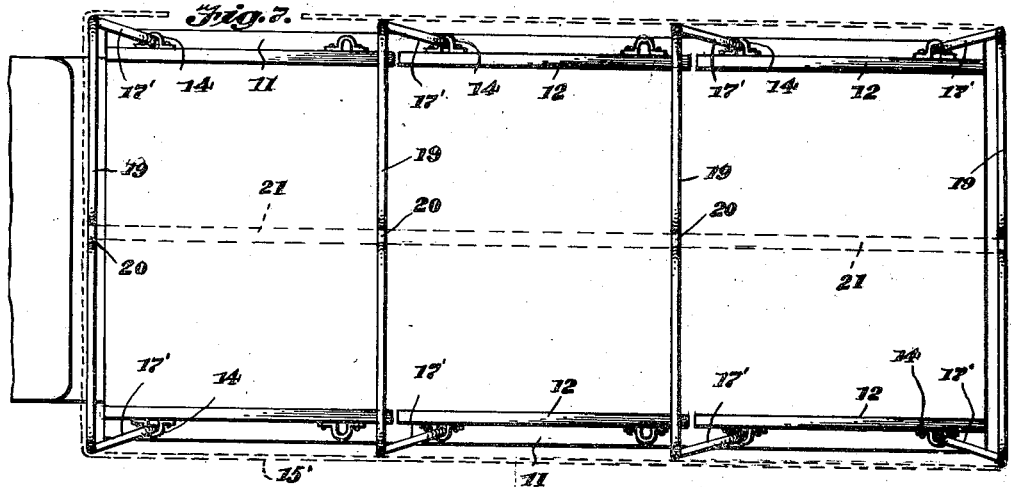
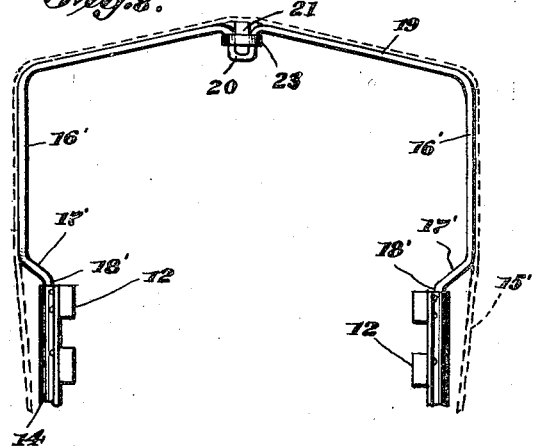
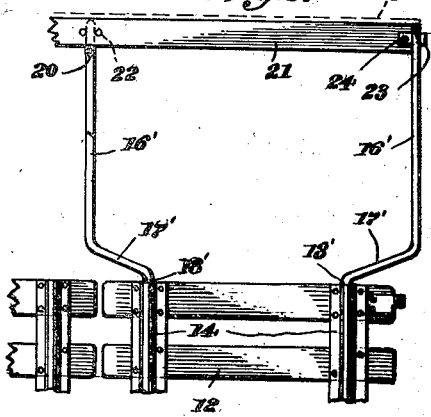
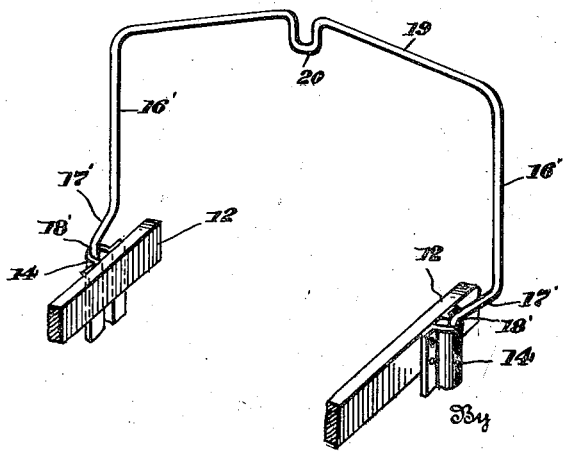
Inventor
W. F. CRAWFORD
By
Attorney Patented May 18, 1937

2,080,762

UNITED STATES PATENT OFFICE 2,080,762

VEHICLE COVER SUPPORT

Wilbur F. Crawford, Waco, Tex.

Application August 3, 1936, Serial No. 94,071

5 Claims. (Cl. 296—104)

My invention relates to improvements in covers for vehicle bodies and to the supports for such covers.

Difficulty has been experienced with the vehicle and truck covers heretofore used because they were subject to excessive wear due to the fact that they came into rubbing contact with projecting portions of the supporting framework, with the body of the vehicle and with the vehicle load.

An important object of my invention is to obviate these difficulties by providing a supporting framework which will support the cover out of rubbing contact with projecting portions of the vehicle and with the vehicle load.

Another object of my invention is the provision of a support for vehicle covers which will increase the effective length and/or width of the cover while maintaining the cover out of rubbing contact with portions of the vehicle and its load.

A further object of my invention is the provision of a device of this character in which the ridge pole is firmly secured in place and does not project beyond the end bows of the supporting framework.

A still further object of my invention is to provide a supporting framework of this character which is inexpensive to manufacture, strong and durable in use and which may be readily installed or removed from the vehicle body.

Other objects and advantages of my invention will be apparent during the course of the following description.

In the accompanying drawings which form a part of this specification and wherein like characters of reference denote like parts throughout.

Figure 1 is a side elevation of a portion of a vehicle having my invention applied thereto, Figure 2 is a transverse sectional view taken on the line 2—2 of Figure 1, Figure 3 is a perspective view of one of the cover supporting bows removed from the vehicle, Figure 4 is a fragmentary perspective view of a portion of one of the intermediate bows showing its connection to the vehicle side board, and to the eaves board and ridge pole.

Figure 5 is an end elevation of one end of the ridge pole showing its connection to the end supporting bow, Figure 6 is a sectional view taken on the line 6—6 of Figure 5, Figure 7 is a top plan view of a vehicle having a modified form of my invention secured thereto, Figure 8 is an end elevation thereof, Figure 9 is a fragmentary side elevation thereof, parts being broken away, and, Figure 10 is a perspective view of one of the supporting bows of Figures 7, 8 and 9.

In the drawings, wherein for the purpose of illustration are shown several preferred embodiments of my invention, the numeral 11 designates the body of a motor vehicle such as a truck having removable side boards or sections 12 which may be of the usual construction. These sections 12 are usually pivotally connected and the pivot rods 13 are frequently employed to secure the side boards to the bed of the vehicle.

Due to the construction of the vehicle bed and to the presence of pivot or other brackets at the forward end of the side boards and the tail gate securing brackets or clamps at the rearward end of the side boards, it is not feasible to place the top supporting sockets or holders 14 at the extreme ends of the side boards, and when spaced from the ends of the side sections, as is customary, the cover supporting bows are also spaced from the ends of the side sections and from the ends of the vehicle bed. As a consequence, when the cover or tarpaulin 15 is drawn over the ends of the vehicle bed and secured thereto, it is subjected to great strain and wear from rubbing against the ends of the bed, the side sections or the load on the bed, and the effective length of the covered portion of the body is reduced.

In applicant's construction, the sockets or holders 14 are spaced from the ends of the sections in the usual manner, as indicated in Figure 1 and preferably extend the full height of the sections 12. The cover supporting bows 16 are illustrated as four in number, although any suitable number may be employed. The bows are identical in construction and each comprises a rod bent into a generally inverted U-shaped formation with its vertical or leg portions adapted to be received in the holders 14. The vertical portions of the bows are offset a substantial distance at points spaced from the lower ends thereof and the offset portions are connected by a horizontal portion 17 which in use is arranged immediately above the upper edges of the side sections 12.

The lower offset foot portions 18 of each bow are received in the holders 14 and the connecting portions 17 are disposed longitudinally of the vehicle body. The forward bow is arranged with its body portion extending forwardly of the side sections while the rearward bow is disposed with its body portion extending rearwardly of the side sections. The intermediate bows may extend in either direction to produce a regular spacing of the cover supporting top or bight portions 19 of the bows.

The top portions 19 of the bows are provided centrally with deep recesses 20 formed therein by bending and the recesses are of a size and shape to snugly receive the ridge pole 21. Suitable pins or projections 22 are arranged on the ridge pole to engage the sides of the recesses 20 of the intermediate bows and prevent movement of the bows longitudinally of the ridge pole. The ridge pole is of a length to extend from the forward edge of the forward bow to the rearward edge of the rearward bow and is removably secured to the end bows by means of clamps 23, each of which consists of a metal strap of substantial width bent into the form of a loop with its ends secured to the ridge pole by a removable bolt 24 at a point adjacent the end bows. The clamps 23 extend across the ends of the ridge pole and around the portion of the bow forming the recesses 20, preventing longitudinal and vertical movement of the ridge pole with respect to the bows.

The flexible canopy or tarpaulin 15 is arranged over the bows and drawn tightly thereover, being secured to the vehicle bed, preferably on the underside thereof. The arrangement of the ridge pole and bows insures a smooth fitting of the cover. The cover will be held out of engagement with the upper edge of the bed and the ends of the side sections by the offset bows, and there is no projecting end of the ridge pole to contact the cover and subject it to undue wear.

In order to prevent sagging of the cover 15 or inward bulging thereof, I may provide horizontally arranged eaves boards 25 having notches 26 to receive the intermediate bows 16 and provided at their ends with metal straps 27 to engage the end bows. Suitable collars 28 may be secured to the vertical portions of the bows adjacent the top portions 19 to support the eaves boards and a transverse eaves board 25' may connect the vertical portions of the forward bow and rest upon the ends of the boards 25. Referring to Figure 2, it will be seen that the eaves boards also tend to maintain the cover 15 out of engagement with the legs of the bows and with the tops of the side sections 12. It is to be understood, however, that my improved cover support may be used either with or without the eaves boards 25 and 25'.

In Figures 7 to 10 a modification of the supporting bows is shown. In this form of the invention, the bows 16' are of the same general configuration as the bows 16 of the other figures and are connected by the ridge pole 21 in the same manner. In the bows 16 of Figures 1 to 4, the foot portions 18 are offset longitudinally and are in the same longitudinal plane as the upper vertical portions of the bows. In Figures 7 to 10, however, the foot portions 18' are offset both longitudinally and transversely and consequently are not in the same longitudinal plane as the vertical portions of the bows. The bows 16' not only extend forwardly or rearwardly of the holders 14 as the case may be, but they also extend laterally beyond the side boards 12 as indicated in Figures 7 and 8, thereby holding the tarpaulin 15' out of contact with the side boards 12. With this arrangement the tarpaulin has no rubbing contact with the side boards or the load and is therefore not subject to wear from such contact. The connecting portions 17' may be horizontally arranged or they may be arranged in a plane inclined from a horizontal plane, as desired. When used with a vehicle body having flared sides, they will be inclined. Due to the lateral extension of the bows 16', eaves boards need not be used, but may be incorporated in this modification if desired to prevent inward bulging of the cover 15'.

As the side sections 12 are usually formed of equal length, and the connecting pivot brackets prevent arrangement of the sockets or holders 14 immediately adjacent the juncture of adjacent sections, it will be seen that the holders 24 are unequally spaced. By arranging the bows 16 and 16' with the offset portions extending in the proper directions, a fairly uniform spacing of the bows may be obtained.

It will be seen that my construction and arrangement of the supporting bows results in the smooth fitting of the cover over the bows and ridge pole and the full covering of the body of the vehicle bed while preventing the undue wear formerly encountered through rubbing of the cover against the edges and corners of the vehicle. The eaves boards 25 serve to brace the bows, to take out any slack in the cover and to prevent rubbing of the cover against the sides of the bows and against the side sections 12. By reference to Figure 2 it will be seen that the eaves boards extend laterally beyond the bows. The ridge pole is securely held in position and serves to brace the bows as well as support the cover.

While I have shown and described several preferred embodiments of my invention it is to be understood that various changes in the size, shape and arrangement of parts may be resorted to without departing from the spirit of my invention or the scope of the subjoined claims.

Having thus described the invention, what is claimed is:

1. The combination with a vehicle bed having side sections and bow holders spaced from the ends of the side sections, of a support for a canopy comprising a forward bow having rearwardly and inwardly offset foot portions arranged in said holders, a rearward bow having forwardly and inwardly offset foot portions arranged in said holders whereby said forward and rearward bows extend forwardly and outwardly, and rearwardly and outwardly beyond said side sections respectively, and a canopy arranged over said bows and secured to the vehicle.

2. In a vehicle, a top supporting bow secured to the vehicle and having its upper portion provided with a substantially U-shaped recess having arms, a ridge pole having its end portion arranged in said recess, a clamp comprising a strap passing across the end of the ridge pole and embracing the arms of the U-shaped recess, said strap being secured to the ridge pole at a point adjacent the bow and serving to clamp said ridge pole in the recess against endwise and upward displacement.

3. In a vehicle, a top supporting bow secured to the vehicle and having its upper portion provided with a recess having arms, a ridge pole arranged in said recess and having its end arranged substantially flush with one edge of the bow, a strap passing across the end of the ridge pole and embracing the arms of said recess, and means to secure the ends of the strap to the ridge pole at a point adjacent the bow, said strap serving to secure the ridge pole against endwise and upward displacement.

4. The combination with a vehicle bed having side sections and bow holders spaced from the forward and rear ends of the side sections, of a support for a canopy comprising a forward bow having rearwardly offset foot portions arranged in the forward bow holders, a rearward bow having forwardly offset foot portions arranged in the rear bow holders, whereby said forward and rearward bows extend forwardly and rearwardly of the side sections respectively to positions preventing contact of a canopy with the upper corners of the side sections, intermediate bows having foot portions offset longitudinally of the vehicle bed and arranged in other holders on said side sections, the offset foot portions of the intermediate bows providing for a substantially uniform spacing of the bows, and a canopy arranged over said bows and secured to the vehicle.

5. The combination with a vehicle body having bow holders secured thereto, of a top supporting bow arranged transversely of the vehicle body, said bow comprising a one-piece inverted substantially U-shaped member including an upper transverse bight portion and vertical leg portions extending downwardly therefrom, the lower portions of the legs of said member being provided with foot portions engaged with said bow holders and offset longitudinally of the vehicle body and transversely inwardly of the leg portions of said member whereby the leg and bight portions of the bow extend transversely outwardly beyond the foot portions, said foot portions lying in a plane parallel to the plane in which the bight portion of said member is disposed.

WILBUR F. CRAWFORD.